United States Patent [19]
Kiekhaefer

[11] 3,774,706
[45] Nov. 27, 1973

[54] WHEEL KIT FOR SNOWMOBILES

[76] Inventor: Elmer Carl Kiekhaefer, 2408 Cypress Gardens Rd., Winter Haven, Fla. 33880

[22] Filed: Oct. 21, 1971

[21] Appl. No.: 191,396

[52] U.S. Cl. .................................. 180/5 R, 180/72
[51] Int. Cl. ..................... B62m 27/02, B62d 61/00
[58] Field of Search ................... 180/5, 6, 9.24, 25, 180/27, 72

[56] References Cited
UNITED STATES PATENTS

| | | | |
|---|---|---|---|
| 3,369,622 | 2/1968 | Thomas | 180/5 R |
| 2,434,759 | 1/1948 | Donovan | 280/106.5 R |
| 2,098,265 | 11/1937 | Ranst | 280/106.5 R |
| 3,521,717 | 7/1970 | Coons | 180/5 R |
| 569,343 | 10/1896 | Mishel | 180/72 |

OTHER PUBLICATIONS

Sessions – German printed App. No. 1,961,977, 6 – 1970

Primary Examiner—Richard J. Johnson
Attorney—Elwin A. Andrus

[57] ABSTRACT

A wheel kit replaces the skis of a snowmobile with a spring mounted front axle having steerable wheels secured thereto by separate kingpins and having leaf springs disposed in an outward flare, and another wheel kit replaces the endless drive track of the snowmobile with a swing frame having its forward end pivotally supported at the axis of the transverse drive shaft of the snowmobile generally beneath the engine at the front end, and having its rear end supported on a transverse shaft carrying a pair of adjacent rear drive wheels with means driving the same from said transverse drive shaft and with resilient means supporting the rear end of the snowmobile upon the swing frame.

9 Claims, 9 Drawing Figures

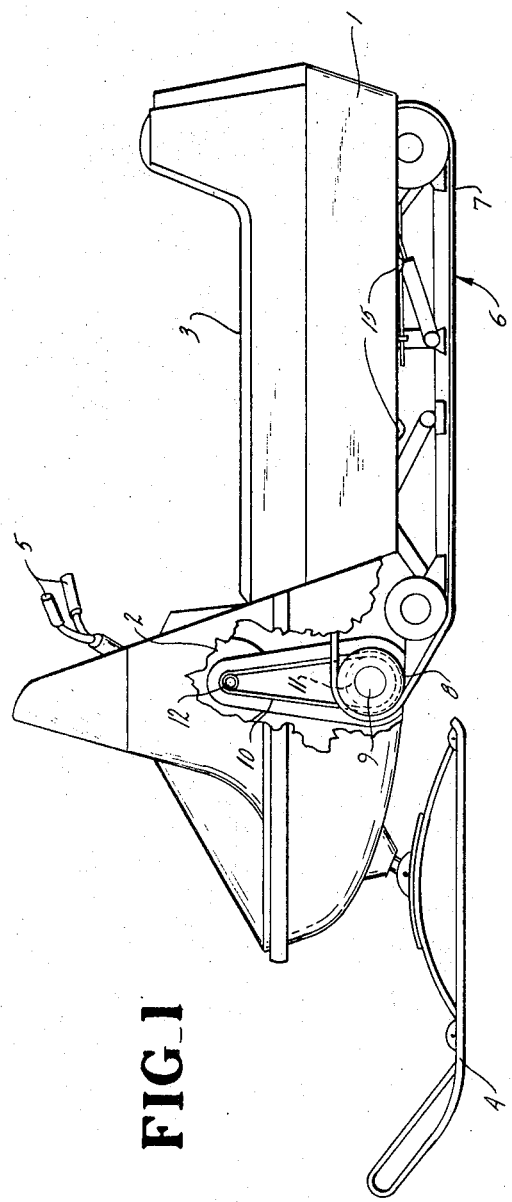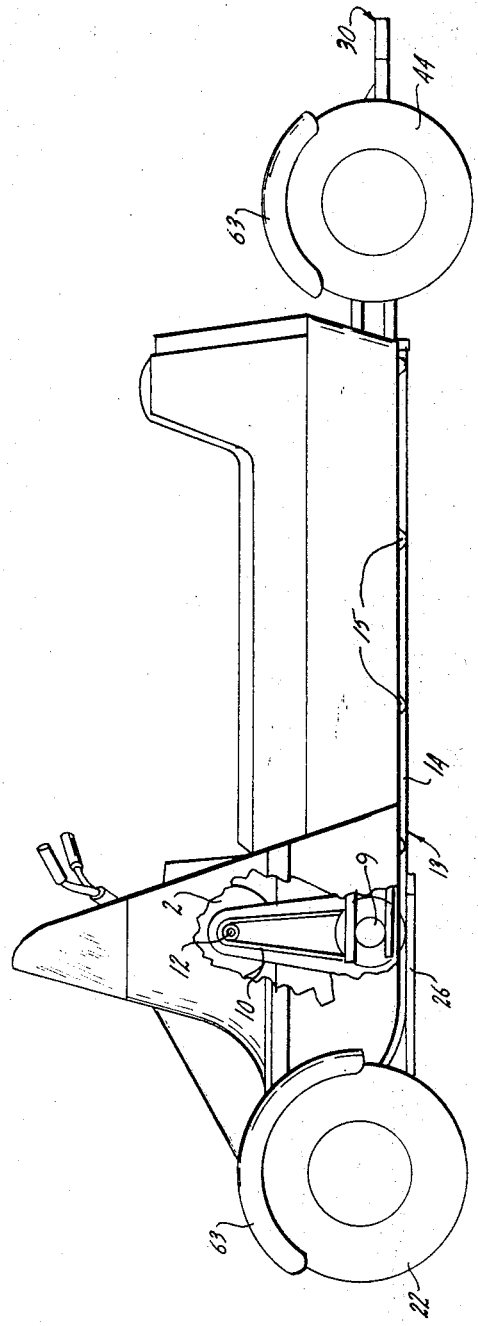

INVENTOR.
ELMER CARL KIEKHAEFER

PATENTED NOV 27 1973 3,774,706
SHEET 3 OF 4
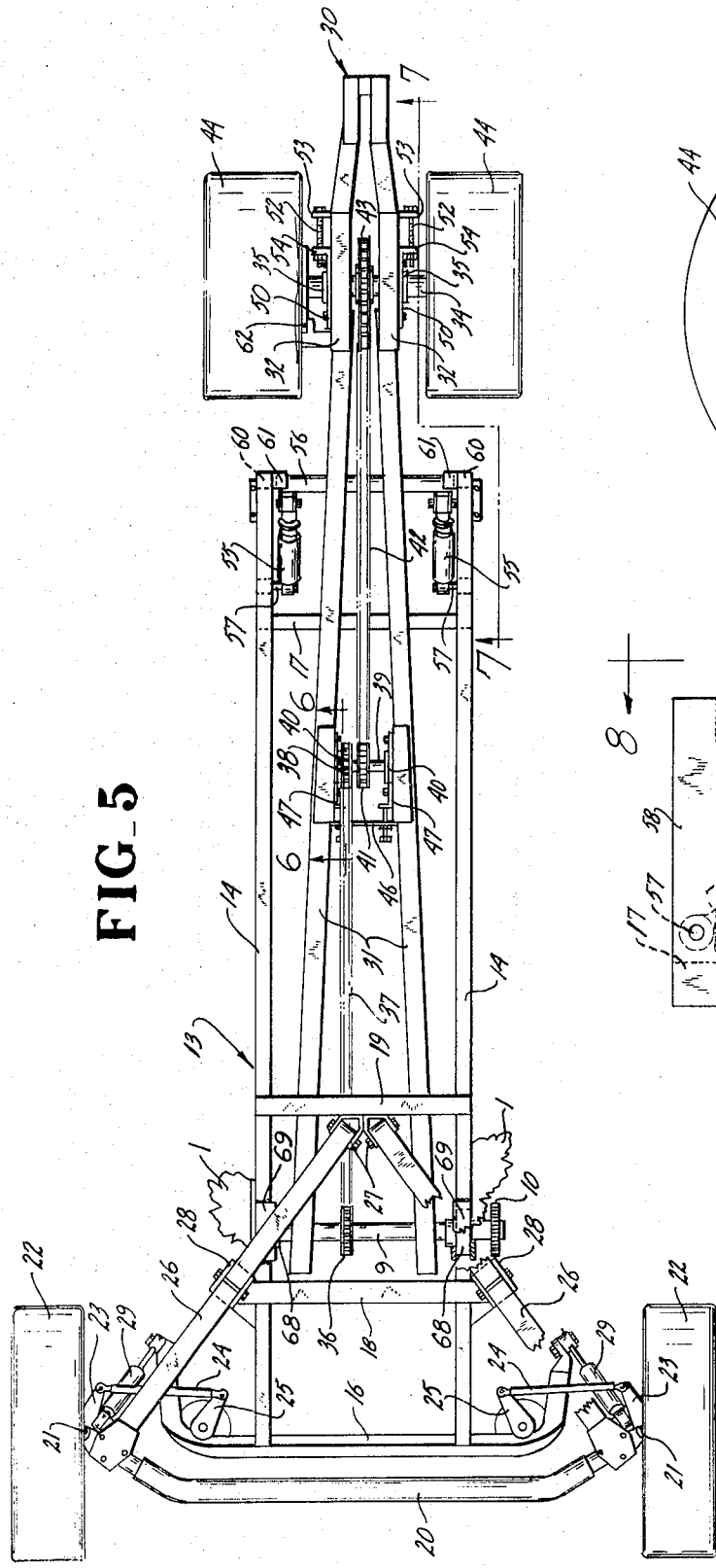
FIG_5
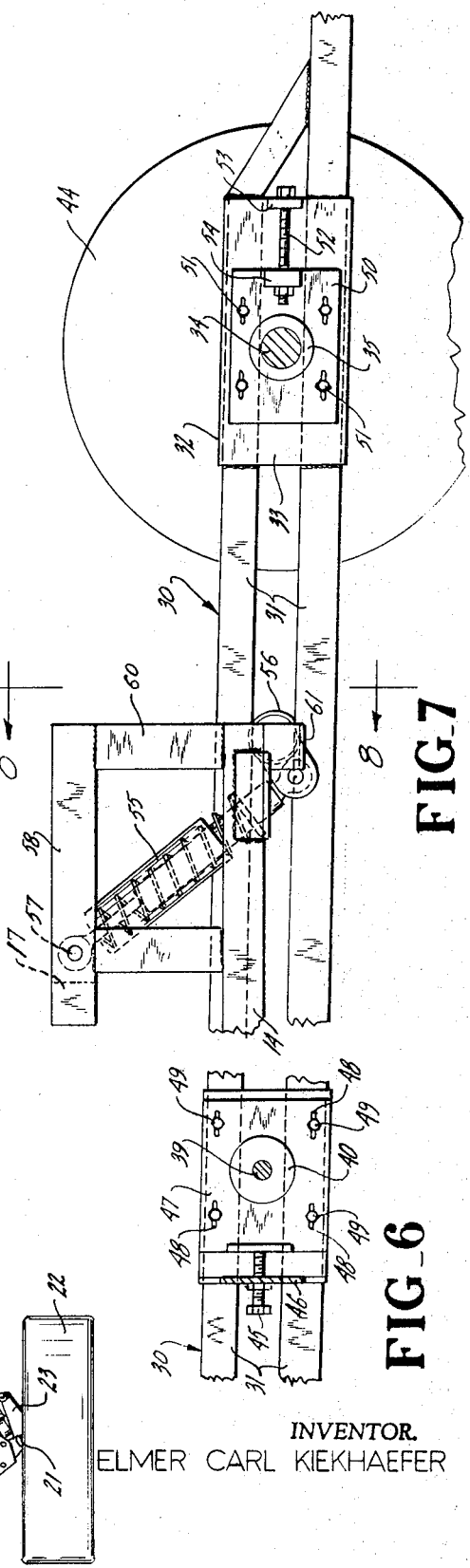
FIG.7
FIG_6
INVENTOR.
ELMER CARL KIEKHAEFER

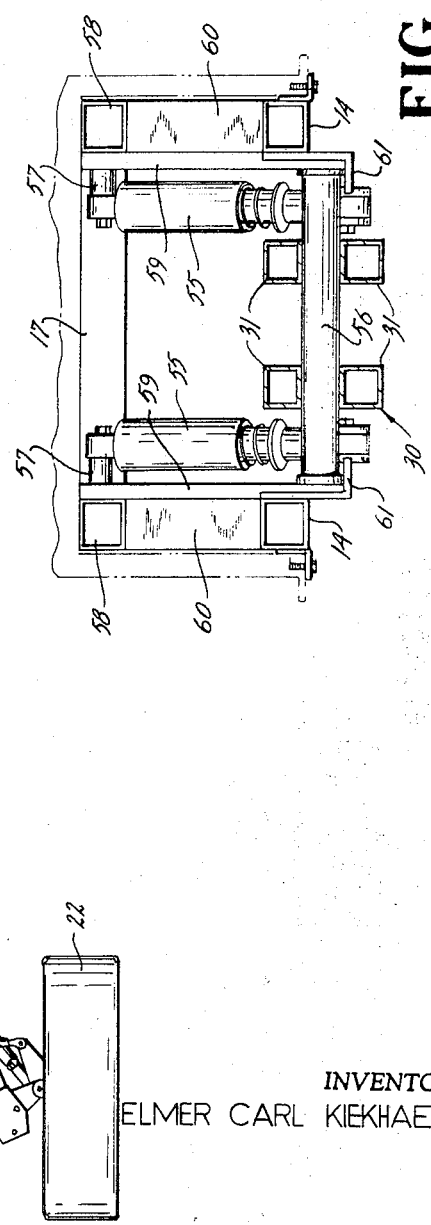
FIG_8
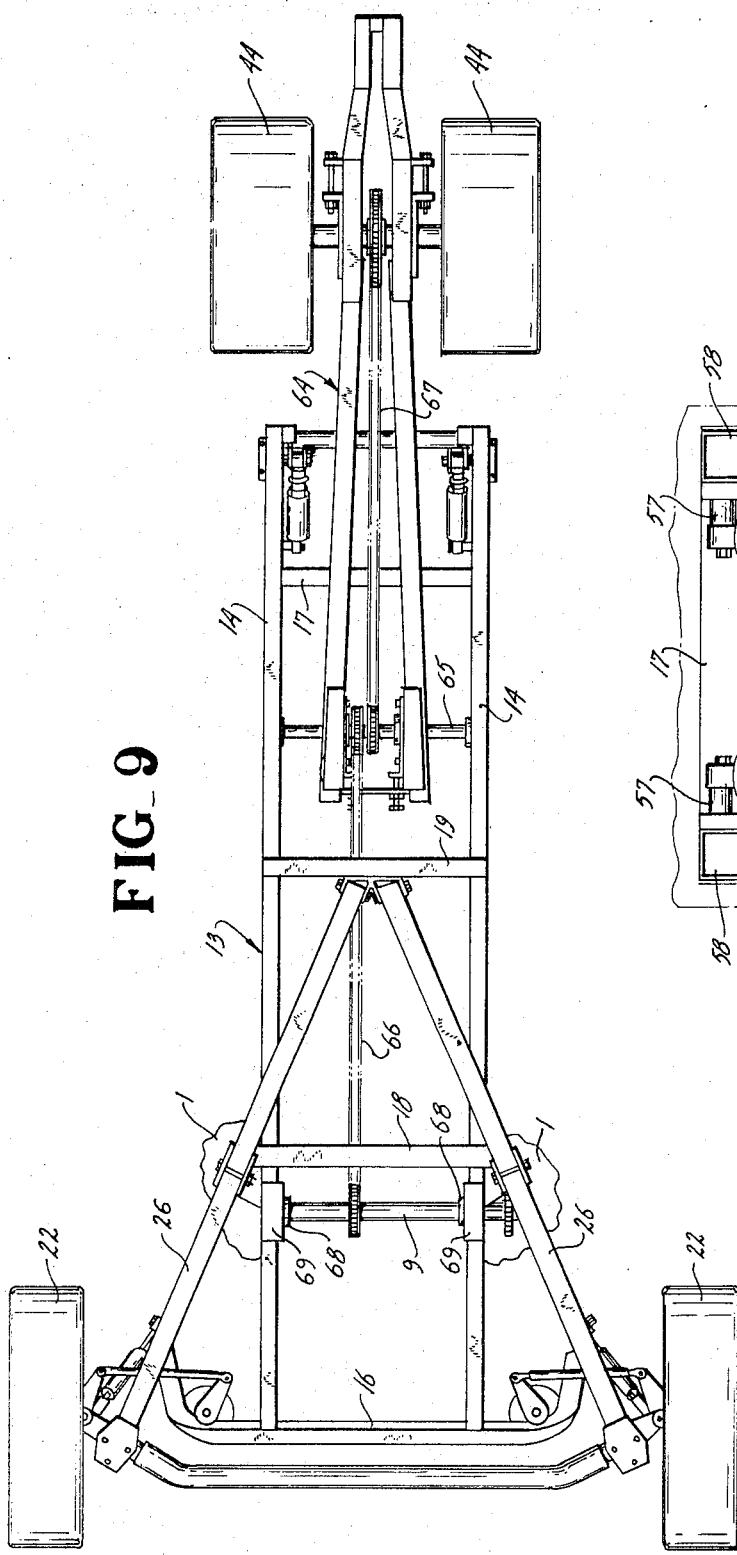
FIG_9
INVENTOR.
ELMER CARL KIEKHAEFER

WHEEL KIT FOR SNOWMOBILES

BACKGROUND OF THE INVENTION

This invention relates to a wheel kit for snowmobiles and which replaces the customary front skis with a pair of steerable wheels, and replaces the customary endless track which normally supports and drives the snowmobile with a pair of rear drive wheels adapted to be driven by the snowmobile engine.

The principal objective of the invention is to provide a ready conversion of a snowmobile into a wheeled vehicle which thereby extends the useful life of the snowmobile to all of the year round as distinguished from normal use limited to a winter season.

Various attempts have been made heretofore to convert snowmobiles to wheeled vehicles for this purpose with structures that present various problems as to installation, mobility, stability, controllability and safety of the driver.

SUMMARY OF THE INVENTION

According to the present invention the kit consists of two sub-kit assemblies, one to replace the front skis on the snowmobile, and the other to replace the endless track supporting and driving the snowmobile.

The first sub-kit assembly comprises a frame adapted to be rigidly secured beneath the body of the snowmobile and a front wheel and axle assembly resiliently carried by the frame and providing for steering of the wheels with connections to the steering mechanism for the front skis.

According to one embodiment of the invention, the second sub-kit assembly comprises a swing frame adapted to pivot on the axis of the transverse drive or sprocket shaft beneath the engine, with resilient means supporting the snowmobile body on the rear end of the frame and drive wheels disposed to support the rear end of the frame upon the ground. A suitable positive drive connection is carried by the frame between the engine and the wheels.

Where chains are employed for the drive connection, a countershaft is carried by the frame intermediate the front drive shaft and the rear drive wheel shaft or axle, and means are provided for tightening the chain between the front drive shaft and the countershaft and for tightening the chain between the countershaft and the drive wheel axle.

According to another embodiment of the invention, the swing frame is pivoted upon the countershaft and the latter is carried by the fixed frame of the first kit.

In both embodiments the front kit frame is rigidly attached to the bearing supports for the sprocket shaft to correlate the torsion and fore and aft forces between the two kit assemblies.

BRIEF DESCRIPTION OF THE DRAWINGS

The drawings furnished herewith illustrate the best mode presently contemplated for carrying out the invention as described hereinafter.

In the drawings:

FIG. 1 is a side elevation of a conventional snowmobile;

FIG. 2 is a side elevation similar to FIG. 1 showing the snowmobile after conversion to a wheeled vehicle by the kits of the present invention;

FIG. 5 is a bottom plan view of the construction of FIG. 2;

FIG. 6 is an enlarged detail view taken on line 6—6 of FIG. 5 and showing the adjustment of the countershaft for tightening the front chain;

FIG. 7 is an enlarged detail view taken generally on line 7—7 of FIG. 5 and showing the shock absorbers and adjustment for the rear axle for tightening of the rear chain;

FIG. 8 is an enlarged sectional view taken on line 8—8 of FIG. 7; and

FIG. 9 is a bottom plan view schematically showing a second embodiment.

DESCRIPTION OF THE PREFERRED EMBODIMENT

Figure 3:
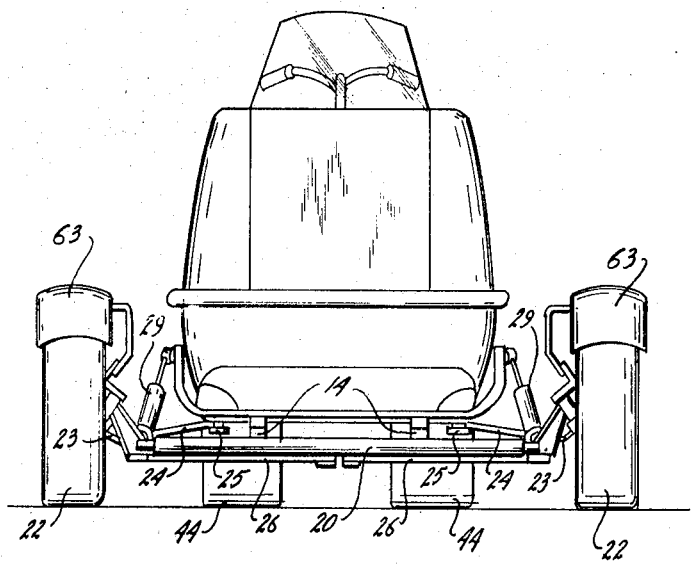
FIG. 3 is a front elevation of the construction of FIG. 2.

FIG. 1 of the drawing illustrates a conventional snowmobile having a rigid body 1 with an engine 2 at the front end and providing a seat 3 to the rear of the engine.

The front end of body 1 is normally supported upon a pair of laterally spaced skis 4 which are connected to be steered by the handle bars 5.

The rear end of body 1 is normally resiliently supported by an endless track assembly 6 having an endless belt 7 driven by suitable cog wheels 8 on a transverse drive shaft 9 beneath the engine 2.

Drive shaft 9 is mounted in suitable end bearings in the frame of body 1 and chain 10 drives a sprocket 11 thereon from a sprocket 12 on the engine 2.

Figure 4:
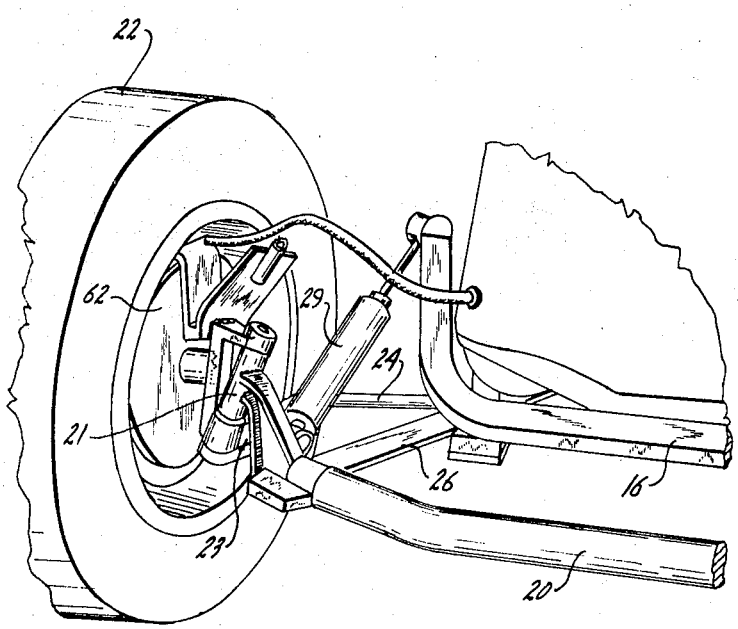
FIG. 4 is a detail view showing the shock absorber and spring mounting for the front axle.

In converting the snowmobile of FIG. 1 to a wheeled vehicle the front skis 4 and the endless track assembly 6 are removed and replaced by the front and rear kits of the present invention as illustrated in FIGS. 2 to 9, inclusive.

The front kit comprises a rigid frame 13 having side rails 14 adapted to be bolted to the side brackets 15 beneath body 1 and which served to secure the resilient mounting for the endless track assembly 6 of FIG. 1.

The side rails 14 are rigidly spaced by a cross bar 16 at their forward ends, a rear cross bar 17, and intermediate cross bars 18 and 19. The cross bars 16 to 19 are preferably welded to the side rails 14.

A rigid front axle 20 extends transversely of the body 1 just forwardly of cross bar 16, and has kingpins 21 at its outer ends for mounting the assemblies for corresponding front steerabble wheels 22.

The steering of wheels 22 is accomplished by a steering arm 23 formed as a part of the steering knuckle at the corresponding kingpin 21, and which arm is connected by a link 24 to an arm 25 on the lower end of the steering mechanism controlled by steering bar 5.

The front axle 20 is resiliently connected to rigid frame 13 by a pair of leaf springs 26 having their rear ends pivotally secured to cross bar 19 by corresponding brackets 27 near the middle of the cross bar, and their forward ends diverging outwardly from each other and secured to the axle 20 near the corresponding kingpins 21. Each spring 26 extends freely through a bracket 28 secured to the corresponding side rail 14 intermediate the ends of the spring at the opposite ends of cross bar 18.

The leaf springs serve as radius rods directly resisting shock on the corresponding front wheels, as anti-sway means whereby twist of the leaf springs resists sway, as the necessary vertical resilient support for the front end of the vehicle, and as means to prevent the front axle from rolling under brake torque thereon.

A pair of hydraulic shock absorbers 29 are preferably mounted between axle 20 and the corresponding ends of the front cross bar 16, and serve to limit the vertical movement of axle 20 relative to the snowmobile body.

The construction of the front kit just described provides a very stable support for the front end of body 1 with the steerable wheels 22 spaced widely apart and readily connected to the steering mechanism of the snowmobile. The triangular arrangement of the springs 26 with each other and the axle 20 provides a very stable mounting for the body 1 which tends to resist lateral sway and prevent shimmy.

The rear kit comprises a swing frame 30 comprising two spaced side rails 31 having their forward ends spaced and pivotally mounted by suitable bearings upon drive shaft 9. The side rails 31 converge toward the rear and merge into a parallel rear portion 32 having vertical side plates 33 welded thereto for mounting the rear axle shaft 34 in adjustable bearings 35.

A sprocket 36 is secured on shaft 9 near the center of the shaft and which drives a chain 37 extending to a sprocket 38 on a countershaft 39 mounted in bearings 40 in side rails 31 intermediate the ends of the latter.

Countershaft 39 drives rear axle 34 by means of a sprocket 41 on shaft 39, chain 42 and a sprocket 43 on axle 34.

Suitable rear drive wheels 44 are secured to the opposite ends of axle 34 for supporting and driving the converted snowmobile. For this purpose the wheels 44 are disposed rearwardly of body 1 and are generally within the overall width of the body so that the danger of injury to a driver or passenger from possible contact with the drive wheels in case of an accident is greatly reduced.

The front chain 37 may be tightened by adjustably moving bearings 40 rearwardly relative to side rails 31 by the adjusting screws 45 threaded through a cross plate 46 secured between rails 31, and which screws bear against flanged mounting plates 47 carrying the corresponding bearings 40. The mounting plates 47 have longitudinal slots 48 therein for receiving bolts 49 which secure the plates in adjusted position to the corresponding side rails 31.

The rear chain 42 may be tightened by moving the bearings 35 rearwardly relative to the side rails 31. For this purpose each bearing 35 has a slotted side plate 50 secured to the outer side of the corresponding side rail 31 and plate 33 by bolts 51 passing through the slots. Suitable adjusting bolts 52 extend forwardly through rear flanges 53 at the rear ends of side rails 31, and through flanges 54 on side plates 50 to adjust the latter longitudinally on the side rails.

The rear end of body 1 is resiliently supported on swing frame 30 by two laterally spaced combination coil spring and hydraulic shock absorber assemblies 55 disposed between a cross member 56 on swing frame 30 and a pivotal bracket 57 on a part 58 secured to the rear end of side rails 14.

The part 58 comprises an upstanding rectangular frame on each side rail 14 at the rear end thereof, and which frame is adapted to fit upwardly in the channel space beneath the body 1 as shown in FIG. 8.

Relative lateral movement between the side rails 31 and the rear end of body 1 is prevented by means of inwardly facing vertical wear plates 59 against which the ends of cross member 56 bear and slide.

Wear plates 59 are supported against displacement by the vertical posts 60 of part 58.

The rear posts 60 have inward flanges 61 at the lower ends thereof which serve as stops to be engaged by cross member 56 and prevent the swing frame 30 from dropping further away from the snowmobile body, when traveling forward over rough ground.

Suitable hydraulic brakes 62 may be provided for the wheels 22 and the rear drive shaft 34.

Fenders 63 may be provided over the wheels 22 and 44 to protect the driver and improve the appearance of the unit.

In operation the converted snowmobile is driven over the ground by rear wheels 44, and the swing frame 30 provides a means for positively drivingly connecting the wheels to the drive shaft 9 and engine 2, and for resiliently supporting body 1.

In the modified construction of FIG. 9, the swing frame 64 is shorter than swing frame 30 and is pivoted at its forward end upon the forward drive shaft 65 which corresponds to countershaft 39 and is mounted in suitable bearing in side rails 14 of frame 13.

The forward drive shaft 65 is driven from shaft 9 by a chain 66 and in turn the shaft 65 drives the rear wheel drive shaft 34 by chain 67.

This construction enables locating cross bars 18 and 19 farther to the rear and lengthening of the leaf springs 26.

The shorter swing frame reduces the unsprung weight and provides for greater vertical movement of wheels 44 relative to body 1.

In both embodiments the drive shaft 9 may be the original sprocket shaft of the snowmobile, but it may be more convenient to provide a substitute shaft with the necessary drive sprockets thereon and which fits into the same mounting as the snowmobile sprocket shaft.

The shaft 9 constitutes the connection between the front and rear kits for the purpose of transmitting tortional forces or twist therebetween.

For this purpose each end bearing 68 for shaft 9 in in body 1 of the snowmobile has a plate 69 bolted thereto and which extends adjacent to the corresponding side frame 14 of the front kit and is welded thereto to tie the front kit rigidly to the shaft mounting.

Various modes of carrying out the invention are contemplated as being within the scope of the following claims particularly pointing out and distinctly claiming the subject matter which is regarded as the invention.

We claim:

1. A wheel conversion device for snowmobiles having a chassis supported at least in part upon an endless track mechanism with a front drive shaft, adapted to replace the track mechanism therefor and comprising a rigid swing frame pivoted at its forward end on a horizontal transverse axis to the snowmobile chassis, a pair of laterally spaced rear wheels disposed on opposite sides of the rear end of said swing frame and extending rearwardly beyond the end of the chassis, a rear drive shaft carrying said wheels and mounted at the rear end of said frame, means to drive said rear drive shaft from a forward drive shaft disposed at said pivotal connection between the chassis and said swing frame, and resilient means adapted to support the rear end of the chassis upon said swing frame.

2. The construction of claim 1 in which the drive connection between said forward drive shaft and said rear drive shaft comprises an intermediate countershaft carried by said swing frame at the pivotal transverse axis therefor, a positive drive connection between said front drive shaft and said countershaft, and a positive drive connection between said countershaft and said rear drive shaft.

3. The construction of claim 2 and separate means to adjust said countershaft and said rear drive shaft longitudinally of said frame.

4. The construction of claim 1 and means adapted to be disposed at the rear end of said snowmobile chassis for limiting relative lateral movement of the chassis and frame.

5. The construction of claim 1 in which said rear drive wheels are adapted to be disposed directly behind the snowmobile chassis.

6. The construction of claim 1 wherein a separate wheel kit is adapted to replace the steerable front skis of the snowmobile and comprises a rigid front axle with a kingpin at each end supporting corresponding steerable wheels spaced outwardly of the position for the snowmobile chassis, means adapted to connect said steerable wheels with the steering mechanism for the snowmobile skis, and means adapted to resiliently support the front end of said snowmobile chassis upon said front axle.

7. A front wheel kit adapted for replacement of the front skis of a snowmobile, comprising a rigid transversely extending frame adapted to be secured to the underside of the snowmobile when the front skis and their mountings have been removed, a front wheel axle having kingpins for separately mounting front steerable wheels at its opposite ends, means adapted to connect the steering knuckles of said wheels to the steering control mechanism of the snowmobile, and resilient means mounting said axle to said frame and providing for limited relative vertical movement between said axle and said frame.

8. The front wheel kit of claim 7 in which said last named means comprises a pair of leaf springs secured at their forward ends to the opposite ends of said axle and secured at their rear ends to said rigid frame near the longitudinal center line thereof.

9. A wheel mounting for snowmobiles having forward skis and a track drive with a forward sprocket drive shaft, comprising in combination a front wheel kit adapted to replace the forward skis of the snowmobile and a rear wheel kit adapted to replace the track drive for the snowmobile, means mounting said rear wheel kit for vertical pivotal swinging on the sprocket drive shaft near the forward end of the snowmobile with the wheels disposed beyond the rear end of the snowmobile and driven from said shaft, and means rigidly mounting said front wheel kit to the bearing supports for said sprocket drive shaft, whereby torsional forces between the front and rear wheels are resisted to provide greater stability for the snowmobile when the wheel kits are secured thereto.

* * * * *